(No Model.)     W. MORAVA.     3 Sheets—Sheet 3.
DYNAMO ELECTRIC MACHINE.

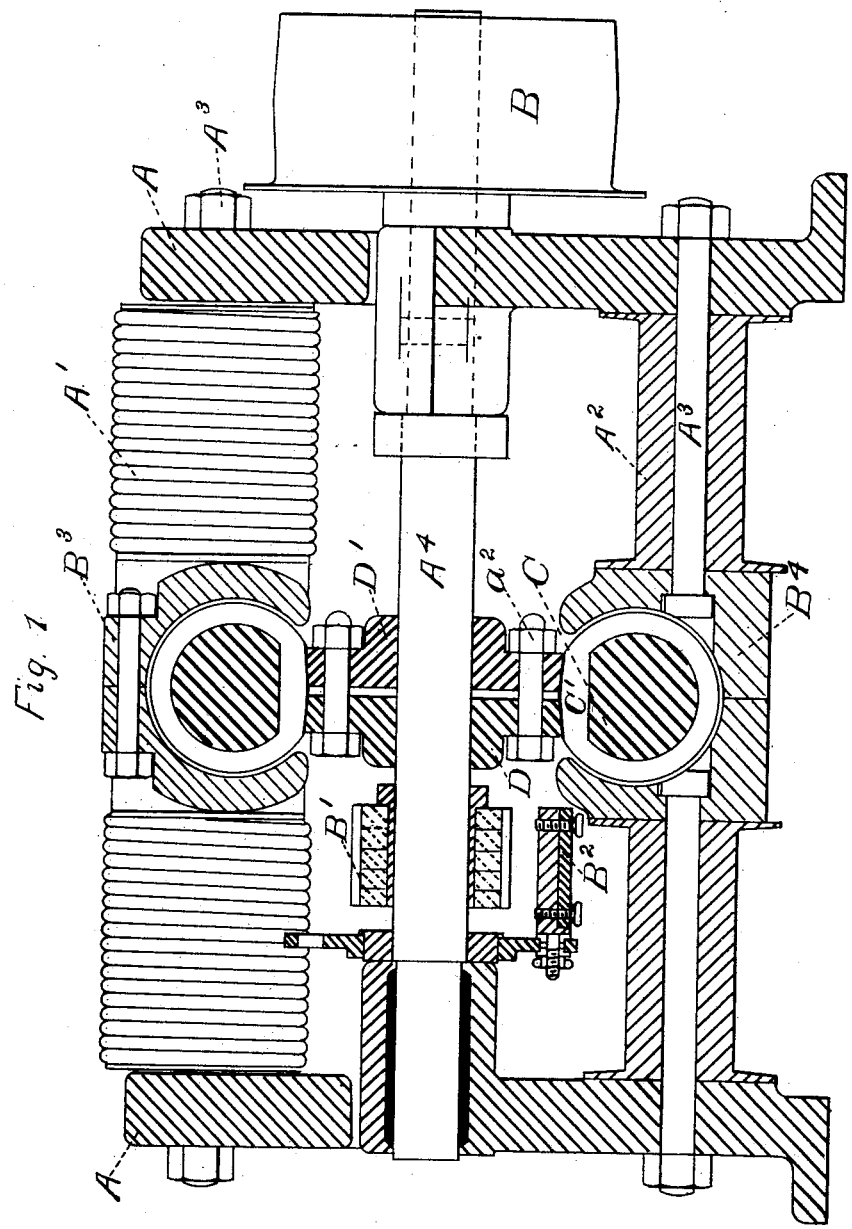

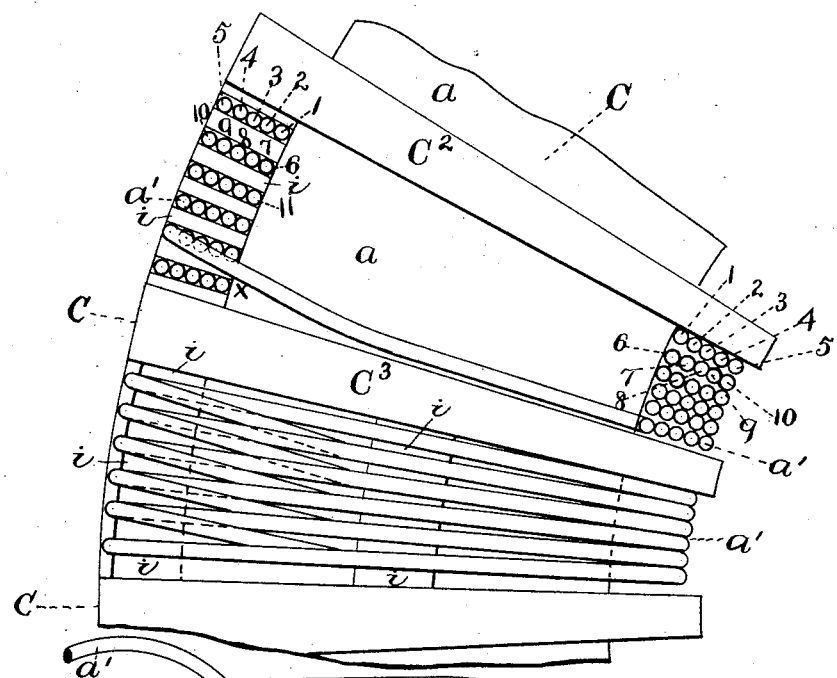
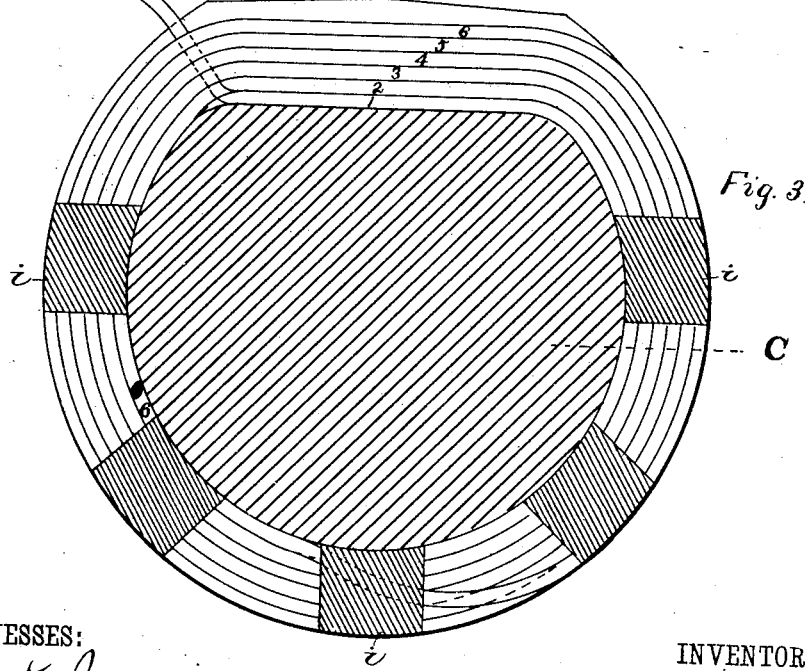

No. 276,063.     Patented Apr. 17, 1883.

WITNESSES:
Chas. F. Jones.
James Beck

INVENTOR
Wensel Morava
BY L. B. Coupland & Co.
ATTORNEYS

UNITED STATES PATENT OFFICE.

WENSEL MORAVA, OF CHICAGO, ILLINOIS.

DYNAMO-ELECTRIC MACHINE.

SPECIFICATION forming part of Letters Patent No. 276,063, dated April 17, 1883.

Application filed May 1, 1882. (No model.)

*To all whom it may concern:*

Be it known that I, WENSEL MORAVA, of Chicago, county of Cook, and State of Illinois, have invented certain new and useful Improvements in a Dynamo-Electric Machine; and I do hereby declare the following to be a full, clear, and exact description of the invention, that will enable others skilled in the art to which it appertains to construct and make use of the same, reference being had to the accompanying drawings, and to letters of reference marked thereon, forming a part of this specification.

This invention relates to improvements in that class of electric machines in which an electric current is generated by means of a ring-armature revolving between the poles of an electro-magnet; and it consists of parts and combination of parts, all as will be hereinafter more fully set forth in detail, and pointed out in the claims.

Figure 4:
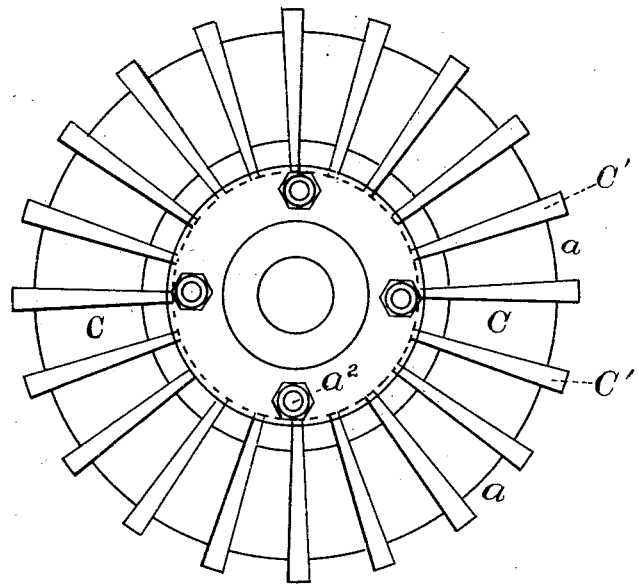
Figure 5:
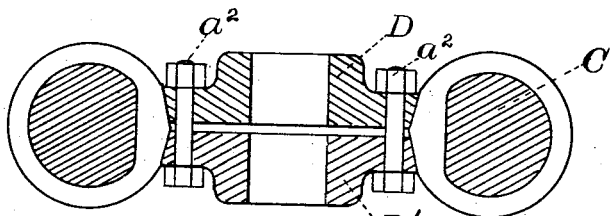

Figure 1 is a vertical longitudinal section of a dynamo-electric machine embodying my improvements. Fig. 2 shows a segment cut out of the armature; and Fig. 3, a transverse section of the same, illustrating the manner of coiling or winding. Fig. 4 is a side elevation of the armature, and Fig. 5 a central transverse section.

Referring to the drawings, A represents the supporting-frame; A', magnets; $A^2$, magnet-spools; $A^3$, bolts supporting the same; $A^4$, the driving-shaft, provided with suitable journal-bearings at each end; B, band-pulley; B', commutator; $B^2$, brush-holder, and $B^3$ $B^4$ the pole-pieces. These are the general features common to this class of machines. The description will be confined to the improvements and the immediate parts relating thereto.

C represents the armature, which consists of a ring of soft cast metal having the series of flanged projections C' formed integral therewith, and arranged at regular intervals in the circumference, and providing the compartments $a$ for the reception of the wire $a'$, used in winding the armature, and disposing of the same in sections, each section occupying one of the spaces between the circular flanges C'. The radial thickness of this armature is so proportioned that the spaces between the flanges on the periphery or outer circumference of the armature are more than twofold as great as they are on the inner circumferential surface, as shown in Figs. 2 and 4 of the drawings. This arrangement is for two purposes: first, it allows the wires to be conveniently divided into sections, thereby making provision for a free circulation of the air to keep the armature in a cool condition; second, to facilitate the winding of the armature with reference to my improvement. This is done in the order in which the wires are numbered in the drawings, the wire being wound around the armature, one coil upon the other, in regular order of succession, as follows: No. 1 next the surface of the armature, No. 2 on top of No. 1, No. 3 on top of No. 2, and so on, until the coil has reached the desired height. Then bring the wire down across the coil already wound and build up the companion coil in the same order, as shown in Fig. 2 of the drawings, and continuing on in this manner until the process of winding is completed. The difference in the area of the spaces between the flanges C' on the inner and outer circumferential surface readily permits me to wind the armature in this manner. Placed between the coils are blocks of wood or wooden wedges which retain the coils in position. The object and advantage of this method is, supposing flange $C^2$ is entering into the influence of one of the poles, the convolution of wires lying next to it, as 1, 2, 3, 4, and 5, will be influenced before the next coil or series of coils, as 6, 7, 8, 9, and 10, and the current induced in the wires will pass through a uniformly-varying magnetic field, which would not be the case if the winding of the armature were proceeded with in the ordinary manner— that is, by first-laying a course of wire on the armature commencing at No. 1 and ending at $x$, then laying the next coil on $x$ and working back to No. 2, continuing alternately in this manner, in which case, if $C^2$ is in a stronger magnetic field than $C^3$, the current has to pass from $C^2$ to $C^3$, then back to $C^2$, and in that way travels back and forth between the flanges. By my method of winding the armature the current has a constant progression in one direction.

The armature, as herein shown, presents a rounded surface to the wires, which facilitates the process of winding, there being no sharp corners to break the wire, and at the same time allows each coil to have a more uniform and continuous bearing on the companion coil.

Another feature of my improvement relates to the manner of securing the armature with reference to the driving-shaft $A^4$. The two disks or hub-pieces D D' are placed upon the driving-shaft and are fitted to the inner circumferential surface of the armature. The periphery of these disks coming in contact with the armature has a conical bearing-surface, the inner projecting edges of the series of flanges C' having a corresponding surface, so that these parts may be wedged together by means of the bolts $a^2$, thereby holding the hub-disks and armature to a close and rigid bearing. The hub-disks are keyed onto the driving-shaft.

I am aware that it is old to wind a continuous wire in coils placed one above the other.

I am also aware that armatures have been made with a rounded surface to receive the coils of wire, and a series of circular flanges projecting outwardly therefrom, and that coils have been arranged in groups having air-spaces between the latter, but am not aware that single tiers of coils separated from one another by air-spaces and arranged in groups having air-spaces between them have ever been used.

Having thus described my invention, what I claim, and desire to secure by Letters Patent, is—

1. In a dynamo-electric machine, the combination, with an armature, of single tiers of coils separated from one another by air-spaces and arranged in groups separated from each other, for the purpose set forth.

2. In a dynamo-electric machine, the combination, with an armature, of tiers of coils separated from each other by air-spaces and held in place by blocks between the tiers, for the purpose set forth.

3. In a dynamo-electric machine, the combination, with the armature-core, of coils of wire arranged radially upon the armature, and having a gradually-increasing air-space from the inner to the outer periphery, and blocks to support the coils, substantially as described, and for the purpose set forth.

4. In a dynamo-electric machine, the combination, with the armature-core having a rounded surface to receive the coils of wire, and a series of circular flanges for dividing the series of coils into groups or sections of said coils, of wires arranged radially upon the armature and having a gradually-increasing air-space from the inner to the outer periphery of the armature, for the purpose set forth.

5. In a dynamo-electric machine, the combination, with an armature having a series of circular flanges, of single tiers of coils having blocks to support them and arranged in groups having a flange on each side, for the purpose set forth.

6. In a dynamo-electric machine, the combination, with the armature C, provided with a series of flanges, C', having groups of coil between them, of disk or hub pieces D D', the driving-shaft $A^4$, and the bolts $a^2$, the joining-surface of said flanges and disks being made correspondingly cone-shaped, for the purpose set forth.

WENSEL MORAVA.

Witnesses:
CHAS. F. JONES,
JAMES BECK.